United States Patent
Rai et al.

(10) Patent No.: US 12,261,522 B2
(45) Date of Patent: Mar. 25, 2025

(54) EFFICIENCY IMPROVEMENT FOR POWER FACTOR CORRECTION BASED AC-DC POWER ADAPTERS

(71) Applicant: Cypress Semiconductor Corporation, San Jose, CA (US)

(72) Inventors: Hariom Rai, Bangalore (IN); Arun Khamesra, Bangalore (IN); Aniket Shashikant Mathad, Bengaluru (IN)

(73) Assignee: Cypress Semiconductor Corporation, San Jose, CA (US)

( * ) Notice: Subject to any disclaimer, the term of this patent is extended or adjusted under 35 U.S.C. 154(b) by 280 days.

(21) Appl. No.: 17/836,873

(22) Filed: Jun. 9, 2022

(65) Prior Publication Data
US 2023/0402914 A1 Dec. 14, 2023

(51) Int. Cl.
*H02M 1/42* (2007.01)
*H02M 7/217* (2006.01)

(52) U.S. Cl.
CPC ......... *H02M 1/4208* (2013.01); *H02M 7/217* (2013.01)

(58) Field of Classification Search
CPC . H02M 1/4208; H02M 7/217; H02M 3/33523
USPC ....................................................... 363/89
See application file for complete search history.

(56) References Cited

U.S. PATENT DOCUMENTS

| | | | |
|---|---|---|---|
| 9,356,524 B2* | 5/2016 | Tsai | H02M 1/4208 |
| 2014/0021874 A1* | 1/2014 | Chen | H05B 45/3725 |
| | | | 315/200 R |
| 2015/0318685 A1* | 11/2015 | Hsieh | H02H 7/1252 |
| | | | 363/53 |
| 2016/0029450 A1* | 1/2016 | Chen | H05B 45/385 |
| | | | 315/206 |
| 2019/0058393 A1* | 2/2019 | Elferich | H05B 45/39 |
| 2020/0412231 A1* | 12/2020 | Khamesra | H02M 1/32 |
| 2020/0412257 A1* | 12/2020 | Rai | H02M 3/33538 |
| 2021/0058000 A1* | 2/2021 | Ahmed | H02J 7/00 |
| 2021/0400789 A1* | 12/2021 | Palliyil Chundethodiyil | ............ |
| | | | H05B 45/345 |

OTHER PUBLICATIONS

Monolithic Power Systems, MP6908A Fast Turn-Off Intelligent Rectifier with No Need for Auxiliary Winding, May 27, 2020, 14 pages.

* cited by examiner

*Primary Examiner* — Yemane Mehari

(57) ABSTRACT

Controlling power factor correction (PFC) in a secondary-controlled alternating current (AC) to direct current (DC) (AC-DC) power adapter is described. In one embodiment, an apparatus includes a transformer, a primary-side controller coupled to the transformer, a PFC component coupled to the primary-side controller, and a secondary-side controller coupled to the transformer. The secondary-side controller is configured at least to obtain data informative of an amount of power, and control, based on the amount of power, a PFC operating mode of the PFC component.

15 Claims, 7 Drawing Sheets

EFFICIENCY IMPROVEMENT FOR POWER FACTOR CORRECTION BASED AC-DC POWER ADAPTERS

TECHNICAL FIELD

This disclosure relates to integrated circuits (ICs) that control Universal Serial Bus (USB) power delivery to electronic devices.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, a power adapter can be an alternating current to direct current (AC-DC) power adapter, including one or more integrated USB power delivery (PD) controllers, such as a primary-side controller and a secondary-side controller that supports dynamically variable switching frequency.

BRIEF DESCRIPTION OF THE DRAWINGS

The disclosure is illustrated by way of example, and not of limitation, in the figures of the accompanying drawings.

DETAILED DESCRIPTION

Figure 1:
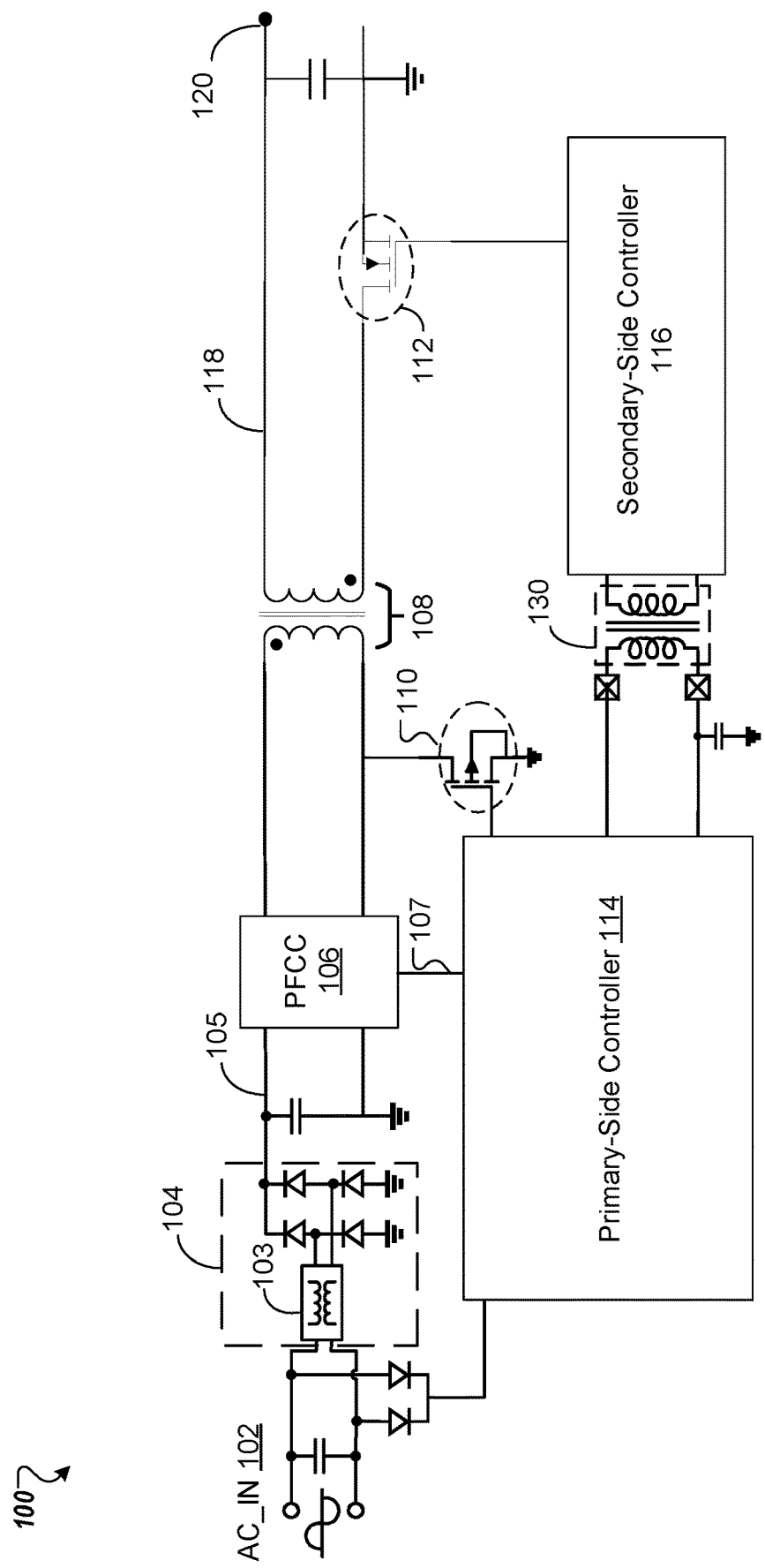
FIG. 1 is a block diagram of a secondary-side controlled (SSC) AC-DC adapter with power factor correction (PFC), according to some embodiments.

The following description sets forth numerous specific details, such as examples of specific systems, components, methods, and so forth, in order to provide a good understanding of various embodiments of the techniques described herein for improving the efficiency of power factor correction (PFC) based AC-DC power adapters, such as used in USB power delivery applications. However, it will be apparent to one skilled in the art that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for improving efficiency for power factor correction (PFC) based AC-DC power adapters. An AC-DC power adapter described herein can be coupled to power lines in electronic devices in USB power delivery (USB-PD). Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery. Embodiments described herein can be used for AC-to-DC power adapters, GaN-based power adapters operating at or above 600 kHz frequencies, power adapters with primary or secondary-side controllers, power adapters operating in modes of operations, such as quasi-resonant mode (QR), discontinuous conduction mode (DCM), continuous conduction mode (CCM), or the like. Embodiments described herein can be used in power-adapter solutions along with Type-C™ PD capability.

A USB-enabled electronic device or system may comply with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications. Still, it extends the performance of the SuperSpeed bus by a collection of features referred to as Enhanced SuperSpeed.

A more recent technology for USB connectors, called USB Type-C™, is defined in various releases and/or versions of the USB Type-C™ specification (e.g., such as Release 1.0, Release 1.1, etc.). The USB Type-C™ specification defines Type-C™ receptacle, Type-C™ plug, and Type-C™ cables that can support USB communications as well as power delivery over newer USB power delivery protocols defined in various revisions/versions of the USB-PD specification. Examples of USB Type-C™ functions and requirements may include, without limitation, data and other communications according to USB 2.0 and USB 3.0/3.1/3.2, electro-mechanical definitions and performance requirements for Type-C™ cables, electro-mechanical definitions and performance requirements for Type-C™ receptacles, electro-mechanical definitions and performance requirements for Type-C™ plugs, requirements for Type-C™ to legacy cable assemblies and adapters, requirements for Type-C™-based device detection and interface configuration, requirements for optimized power delivery for Type-C™ connectors (also referred to as USB-C connectors), etc. According to the USB Type-C™ specification(s), a Type-C™ port provides VBUS, D+, D−, GND, SSTX+, SSTX−, SSRX+, and SSRX− lines, among others. In addition, a Type-C™ port also provides a Sideband Use (denoted SBU) line for signaling of sideband functionality and a Configuration Channel (denoted CC) line for discovery, configuration, and management of connections across a Type-C™ cable. A Type-C™ port may be associated with a Type-C™ plug and/or a Type-C™ receptacle. The Type-C™ plug and the Type-C™ receptacle are designed as a reversible pair that operates regardless of the plug-to-receptacle orientation for ease of use. Thus, a standard USB Type-C™ connector, disposed as a standard Type-C™ plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0, Revision 2.0, Revision 3.0, etc., or later revisions/versions thereof). The USB-PD specification defines a standard protocol designed to enable the maximum functionality of USB-enabled devices by providing more flexible power delivery along with data communications over a single USB Type-C™ cable through USB Type-C™ ports. The USB-PD specification also describes the architecture, protocols, power supply behavior, parameters, and cabling necessary for managing power delivery over USB Type-C™ cables at up to 100 W of power. According to the USB-PD specification, devices with USB Type-C™ ports (e.g., USB-enabled devices) may negotiate for more current and/or higher or lower voltages over a USB Type-C™ cable than are allowed in older USB specifications (e.g., the USB 2.0 Specification, USB 3.1 Specification, the USB Battery Charging Specification Rev. 1.1/1.2, etc.). For example, the USB-PD specification defines the requirements for a power delivery (PD) contract that can be negotiated between a pair of USB-enabled devices. The PD contract can specify both the power level and the direction of power transfer that both devices can accommodate and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled inline on the VBUS line and configured to turn power delivery on and off.

A USB-PD power source may be configured to draw power from an alternating current (AC) power adapter or another AC source. Thus, as part of an alternating current-to-direct current (AC-DC) conversion, some implementations may use a large bulk capacitor on the power source side of the VBUS line to remove the power signal's AC component. Turn-ON and turn-OFF of power switches (also called power FETs) may allow for further circuit protection based on analysis of current and voltage conditions and the detection of faults.

An AC-DC power adapter described herein can be a secondary-side controlled (SSC) AC-DC power adapter. An SSC AC-DC power adapter described herein can be implemented using an SSC flyback converter coupled to power lines in electronic devices in USB power delivery (USB-PD). An SSC AC-DC power adapter can include a primary-side controller communicatively coupled with a secondary-side controller, and a PFC controller communicatively coupled with the primary-side controller. A transformer (e.g., a pulse transformer or core-less transformer) can act as a communication link between the primary-side controller and the secondary-side controller. The delay of this link may be important for zero voltage switching (ZVS) and valley switching as the delay can impact efficiency.

AC-DC power adapters may need to implement power factor correction (PFC) if the power level is sufficiently high (e.g., greater than 75 watts (W)). Without implementing PFC, a phase difference may exist between the current and input voltage, which can result in loss and high peak currents. The effects of the phase difference can therefore increase total harmonic distortion (THD) of the input current. THD is a measurement of the harmonic distortion present in a signal. It can be defined as the ratio of the sum of the powers of all harmonic components to the power of the fundamental frequency. In power systems, lower THD is associated with lower peak currents, less heating, lower electromagnetic emissions, etc. A PFC controller can enable PFC, which can draw input current in phase with the input voltage. For example, PFC can maintain THD of the input current that is suitable low (e.g., less than or equal to 5% at full load). Some AC-DC power adapters can support a wide power range (e.g., 0.1 W to 100 W). Since an AC-DC power adapter can remain in a lower power mode for a majority of the time (e.g., about 80% of the time), keeping PFC enabled in a lower power mode can result in efficiency loss during operation in the lower power mode. Accordingly, although PFC is beneficial during higher power level operation, PFC can be viewed as unnecessary overhead for operation at lower power levels.

In an SSC AC-DC power adapter, the secondary-side controller can have complete information regarding electrical parameters related to the load requirements on the power output. Examples of electrical parameters include output voltage, load current, output power, AC line-in, etc. Thus, the primary-side controller need not have access to such information and can be designed with minimal intelligence since any intelligence added to the primary-side controller can result in: a larger chip area due to higher technology node, which results in higher costs; higher mask count due to the intelligence logic circuitry needing more fuses or non-volatile memory, which results in higher costs; and higher power loss due to an additional circuit. Accordingly, the primary-side controller may not have the information to determine whether it would be beneficial to cause the PFC controller to enable/disable PFC.

Described herein are various embodiments of techniques for improving efficiency for power factor correction (PFC) based AC-DC power adapters. An AC-DC power adapter described herein can be a secondary-side controller (SSC) AC-DC power adapter. For example, an AC-DC power adapter can include a primary-side having a primary-side controller, a secondary-side having a secondary-side controller communicatively coupled with the primary-side controller, a PFC controller communicatively coupled with the primary-side controller, and a transformer (e.g., pulse transformer or core-less transformer) providing galvanic isolation between the primary-side controller and the secondary-side controller.

Embodiments described herein can utilize the secondary-side controller to dynamically control PFC without using any additional board components, pins, or smart circuitry within the primary-side controller. The secondary-side controller can have complete information about a power mode, such as the output voltage, load current, output power, and AC line-in. For lower power modes in which PFC would be wasteful in view of a power threshold condition, the secondary-side controller can send a PFC-disable pulse pattern to the primary-side controller to disable PFC via the PFC controller. Conversely, for higher power modes that can benefit from PFC in view of a threshold condition, the secondary-side controller can send a PFC-enable pulse pattern to the primary-side controller to enable PFC via the PFC controller. Accordingly, embodiments described herein can enable communication between the secondary-side controller and the primary-side controller to provide dynamic on-the-fly PFC control in view of power conditions.

In some embodiments, the power threshold condition is a pre-defined power threshold value. Illustratively, the pre-defined power threshold value can be about 75 W. In some embodiments, the power threshold condition is a pre-defined range of power values. For example, the pre-defined range of power values can be between about 25 W to about 75 W. As another example, the pre-defined range of power values can be between 50 W to 75 W. The power threshold condition can be programmable (e.g., a programmable power threshold value or programmable range of power values).

In some embodiments, the PFC enable/disable control signal is implemented using time-multiplexing. For example, level-based amplitude modulation or a communication pattern can be used as a signal to the primary-side controller to enable/disable PFC using a specific protocol. In some embodiments, the PFC enable/disable control signal can be interleaved with a primary field-effect transistor (FET) control signal.

For example, in response to determining that an amount of power does not satisfy a power threshold condition (e.g., the amount of power is greater than the power threshold value), the secondary-side controller can send a PFC-enable pulse pattern to the primary-side controller to enable PFC via the PFC controller. Conversely, in response to determining that the amount of power satisfies the power threshold condition (e.g., is less than or equal to the power threshold value), the secondary-side controller can send a PFC-disable pulse pattern to the primary-side controller to disable PFC via the PFC controller. One example of a PFC-enable pulse pattern is that three consecutive pulses at a particular voltage generated by the secondary-side controller signal the primary-side controller to cause the PFC controller to enable PFC. One example of a PFC-disable pulse pattern is that two consecutive pulses at the particular voltage generated by the secondary-side-controller signal the primary-signal controller to cause the PFC controller to disable PFC. For example, the voltage can be about 1.8 V.

Embodiments described herein may address the above-mentioned and other challenges by providing a serial bus-compatible power supply device, such as a serial bus power delivery (SBPD) device with a power control analog subsystem having hardware, firmware, or any combination to communicate information, including a multi-level control signal from a secondary-side controller to intelligently control PFC enablement, across a galvanic isolation barrier. An AC-DC power adapter may be a USB-compatible power supply device. Embodiments described herein can also be implemented in other types of power adapters, power converters, power delivery circuits, or the like. Advantages of the PFC enabling/disabling scheme described herein include improved efficiency at lower power without additional complexity, reduced resource consumption, increased flexibility, and programmability (e.g., based on output power and line-in information, PFC can be enabled/disabled based on a programmable power threshold).

FIG. 1 is a block diagram of a secondary-side controlled (SSC) AC-DC adapter ("adapter") 100 with power factor correction (PFC), according to some embodiments. In some embodiments, the adapter 100 includes an SSC flyback converter. The adapter 100 includes a rectifier component 104 coupled between an alternating current (AC) input 102 and a rectified DC line 105. The rectifier component 104 can include an electromagnetic interference (EMI) filter 103 and a rectifier (e.g., full-bridge rectifier) including a set of diodes. VIN is the voltage on the rectified DC line 105 after passing through the rectifier component 104.

The adapter 100 can further include a power factor correction component or circuitry (PFCC) 106 configured to operate in a PFC-enable mode to enable PFC or a PFC-disable mode to disable PFC, a transformer 108 (e.g., flyback transformer), a primary-side FET 110 (also referred to as a primary-side power switch, a power FET, or a primary-side FET), a secondary-side FET 112 (also referred to as secondary-side power switch, power FET, or secondary-side FET), a primary-side controller 114, and a secondary-side controller 116. As will be described in further detail herein, the operation of the PFCC 106 can be controlled by communication between the secondary-side controller 116 and the primary-side controller 114.

The rectified DC line 105 is coupled to a first end of a primary winding of the transformer 108. A second end of the primary winding is coupled to a primary drain of the primary-side FET 110. A first end of the secondary winding of the transformer 108 is coupled to a direct current (DC) output line 118, and a second end of the secondary winding of the transformer 108 is coupled to a secondary drain of the secondary-side FET 112. In an alternate embodiment, the DC blocking capacitor may be coupled between the drain node of the primary-side FET 110 and the source node of the active clamp. "VBUS_IN" is the voltage on the DC output of the transformer 108. "SR DRAIN" is the drain node of the secondary-side FET 112. The DC output line 118 and the secondary-side FET 112 are coupled to DC output terminals 120.

The adapter 100 can be used for AC-DC conversion with galvanic isolation. The adapter 100 can use an inductor split with the transformer 108, establishing a galvanic isolation barrier between a primary-side including the primary-side FET 110 and the primary-side controller 114 and a secondary-side including the secondary-side FET 112 and the secondary-side controller 116. When the primary-side FET 110 is closed (or turned ON), the primary-side of the transformer 108 is connected to the input voltage source. In this embodiment, the primary-side of the transformer 108 is coupled to the rectifier component 104. As the primary current and magnetic flux in the transformer 108 increases, energy is stored in the transformer core of the transformer 108. When the primary-side FET 110 is opened (or turned OFF), the primary current drops and the magnetic flux stored in the fly-back transformer 108 results in current to start flowing on secondary side. The energy stored in the transformer 108 is transferred to an output load. An output capacitor can be used to supply energy to the output load when the primary switch (e.g., the primary-side FET) is engaged. Thus, the transformer 108, based on control of the primary-side FET 110, can store energy and transfer the energy to the output of the adapter 100. It should also be noted that the adapter 100 can include other components in the input stage, in the output stage, or in both. For example, a bulk capacitor can be coupled between the output of the rectifier component 104 and a ground node. During operation, the AC input 102 is rectified and filtered by the rectifier component 104 and the bulk capacitor. This creates a DC high voltage bus which is connected to the primary winding of the transformer 108. Similarly, in the output stage, the secondary winding power is rectified and filtered, such as by a diode, a capacitor, output LC-filters, or the like, to reduce the output voltage ripple. Other output voltages can also be realized by adjusting the transformer's turn ratio and the output stage. In some embodiments, other converters may be used instead of the transformer, e.g., a switching converter, or the like.

The adapter 100 can operate as an isolated power converter. The two prevailing control schemes are voltage mode control and current mode control. Both control schemes use a signal related to the output voltage. A transformer 130 (e.g., pulse transformer or core-less transformer) can be coupled to the secondary-side controller 116 and the primary-side controller 114 and can provide a galvanic isolation barrier between the secondary-side controller 116 and the primary-side controller 114. The transformer 130 can be used to obtain tight voltage and current regulations.

The secondary-side controller 116 is configured to generate pulses, and the primary-side controller 114 can include receiver circuitry configured to receive the pulses from secondary-side controller 116 across the galvanic isolation barrier via the transformer 130. In one embodiment, the receiver circuitry can include a pulse-width modulation (PWM) circuit. Alternatively, the receiver circuitry can use other types of circuits to receive the pulses across the galvanic isolation barrier.

The secondary-side controller 116 can be configured to generate primary-side FET control pulses having respective levels used to control the primary-side FET 110 (e.g., turn on/off the primary-side FET 110). As will be described in further detail below with reference to FIGS. 2-3, the primary-side controller 114 can include a first receiver to receive the primary-side FET control pulses. The primary-side FET control pulses can include a primary-side FET turn-on pulse having a first level to turn on the primary-side FET 110 and a primary-side FET turn-off pulse having a second level to turn off the primary-side FET 110. In some embodiments, the first level is a positive level, and the second level is a negative level. For example, the first level can be about 3.3 V. As described herein, the first and second pulses can have fixed widths or variable widths. In response to receiving the primary-side FET turn-on pulse, the primary-side controller 114 can apply a pulse or a high voltage level (for example, 12V) to the gate of the primary-side FET 110 to turn on the primary-side FET (e.g., cause the drain of the primary-side FET 110 to go low). In response to receiving the primary-side FET turn-off pulse, the primary-side-controller 114 can apply a pulse or a low voltage level (for example 0V) to the gate of the primary-side FET 110 to turn off the primary-side FET (e.g., cause the drain of the primary-side FET 110 to go high).

The secondary-side controller 116 can be further configured to generate PFCC control pulses used to control the PFCC 106 (e.g., enable/disable PFC). For example, as will be described in further detail below with reference to FIGS. 2-3, the secondary-side controller 116 can implement a pulse protocol that causes the primary-side controller 114 to cause the PFCC 106 to enable/disable PFC. For example, the primary-side controller 114 can include a second receiver to receive the PFCC control pulses. The PFCC control pulses can each have multiple levels. In some embodiments, the first level is a positive level, and the second level is a negative level. For example, the first level can be about 3.3 V. As described herein, the first and second pulses can have fixed widths or variable widths. In response to receiving the primary-side FET turn-on pulse, the primary-side controller 114 can apply a pulse or a high voltage level (e.g., 12V) to the gate of the primary-side FET 110 to turn on the primary-side FET (e.g., cause the drain of the primary-side FET 110 to go low). In response to receiving the primary-side FET turn-off pulse, the primary-side-controller 114 can apply a pulse or a low voltage level (e.g., 0V) to the gate of the primary-side FET 110 to turn off the primary-side FET (e.g., cause the drain of the primary-side FET 110 to go high).

The secondary-side controller 116 can send any combination of pulses indicating 0s and 1s with a specific pattern (protocol) from the secondary-side controller 116 to the primary-side controller 114 without requiring clock synchronization. In one embodiment, the secondary-side controller 116 includes a state machine to synchronize each function of the primary-side controller 114 to be programmed (e.g., calibrated, trimmed, or the like). The secondary-side controller 116 can store other information, such as user-defined settings. For example, the user-defined settings pertaining to the primary-side functionality, such as over-voltage (OV), under-voltage (UV), over-current (OC), short-circuit detection, over-temperature (OT), line voltage, peak current limits, or the like, can be stored in the non-volatile memory of the secondary-side controller 116. Firmware of the secondary-side controller 116 can transfer this information to the primary-side controller 114 in a similar manner at appropriate times, such as at boot-up or later during the operation of the converter at a specific time. During a no-load case where the AC-DC can be in SKIP state, information regarding the turning on of the primary-side FET 110 is not required to be sent.

Figure 2:
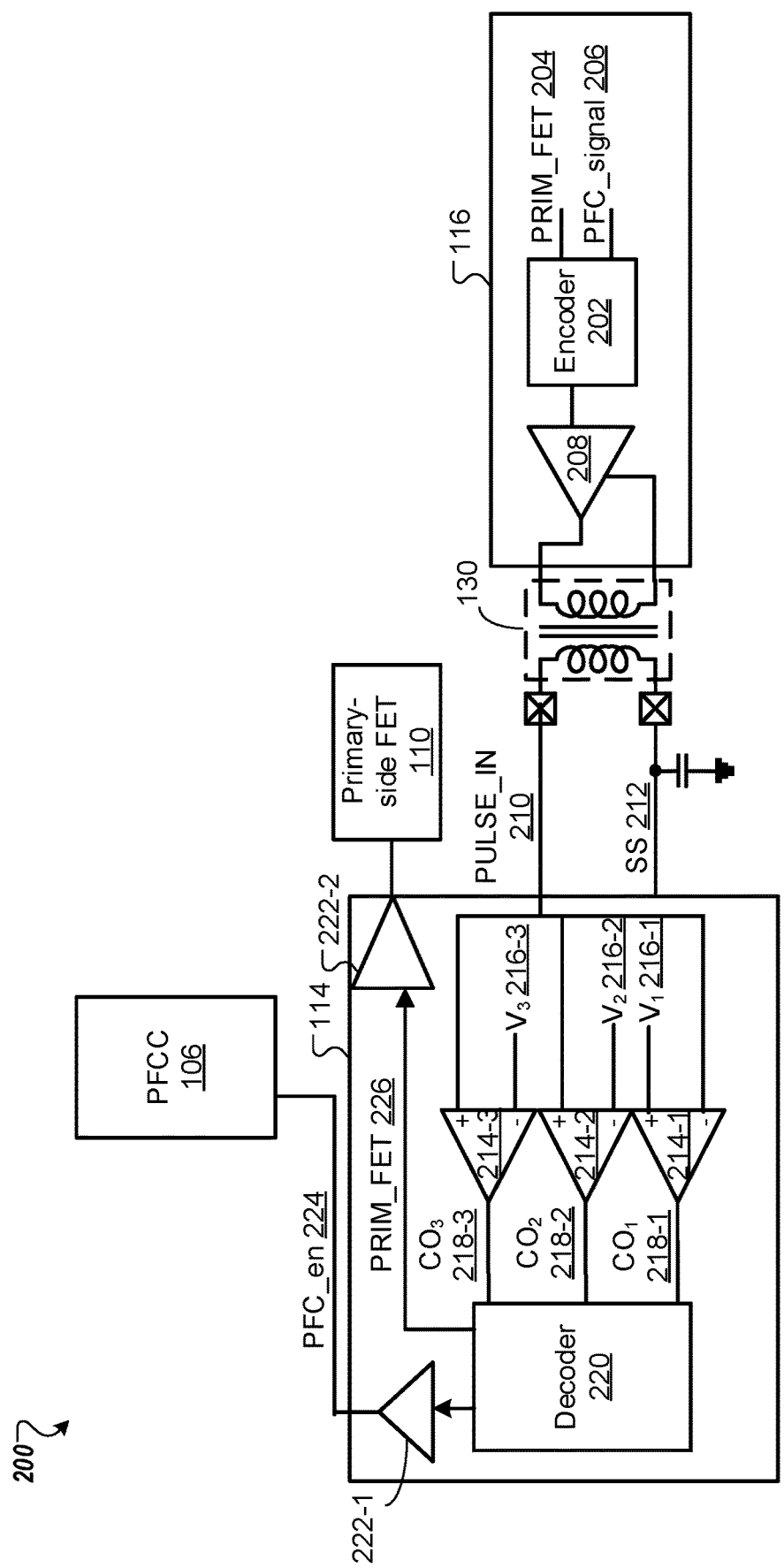
FIG. 2 is a block diagram of a portion of a secondary-side controlled (SSC) AC-DC adapter with power factor correction (PFC), according to some embodiments.

FIG. 2 is a block diagram of a portion of a secondary-side controlled (SSC) AC-DC adapter with power factor correction (PFC) ("adapter") 200, according to one embodiment. Although not all components of the adapter 200 are shown, the adapter 200 can be similar to the adapter 100 of FIG. 1. For example, the adapter 200 can include PFCC 106, primary-side FET 110, primary-side controller 114, and secondary-side controller 116.

The secondary-side controller 116 is configured to generate signal pulses ("pulses") for communication with the primary-side controller 114. For example, the secondary-side controller 116 can include an encoder 202. The encoder 202 can be configured to receive a PRIM_FET signal 204 and a PFC signal 206, and generate an encoder signal. The secondary-side controller 116 can further include a driver 208 configured to drive the encoder signal across the galvanic isolation barrier of the transformer 130 to the primary-side controller 114 as an input signal through pin ("PULSE_IN") 210 and a pin ("Soft-Start", or "SS") 212.

The primary-side controller 114 can include a number of comparators 214-1 through 214-3 configured to receive respective input signal voltages $V_1$ 216-1 through $V_3$ 216-3 from PULSE_IN 210, and generate respective comparator outputs (COs) $CO_1$ 218-1 through $CO_3$ 218-3. In some embodiments, $V_1$ 216-1 is a low voltage, $V_2$ 216-2 is a medium voltage, and $V_3$ 216-3 is a high voltage. For example, $V_1$ 216-1 can be a negative voltage, $V_2$ 216-2 can be a positive voltage, and $V_3$ 216-3 can be a positive voltage greater than $V_2$ 216-2. Illustratively, $V_2$ 216-2 can be 1.8 V, and $V_3$ 216-3 can be 3.3 V. The primary-side controller 114 can further include a decoder 220 configured to decode the pulses received from the secondary-side controller 116.

In some embodiments, the secondary-side controller 116 can employ a PFC control pulse protocol to cause the primary-side controller 114 to enable/disable PFC and a primary-side FET control pulse protocol to cause the primary-side controller 114 to activate or deactivate (i.e., turn on or turn off) the primary-side FET 110. In some embodiments, the secondary-side controller 116 can implement level-based amplitude modulation to employ the pulse protocols.

For example, regarding the PFC control pulse protocol, the PFC control pulse protocol can employ pulse patterns. The pulse patterns can include a PFC-enable pulse pattern defined by a first number of consecutive pulses having a first signal level, and a PFC-disable pulse pattern defined by a second number of consecutive pulses having the first signal level, where the first number of consecutive pulses is different from the second number of consecutive pulses. For example, the first number of consecutive pulses can be three pulses, and the second number of consecutive pulses can be two pulses. The first signal level can be $V_2$ 216-2 (e.g., 1.8 V). Further details regarding the PFC-enable pulse pattern and the PFC-disable pulse pattern are described below with reference to FIG. 3.

In response to the decoder 220 determining that the secondary-side controller 116 has sent the PFC-enable pulse pattern, the decoder 220 can use a driver 222-1 to drive a PFC-enable control signal ("PFC enable") 224 from low to high. PFC_en 224 can cause the PFCC 106 to enable PFC. Similarly, in response to the decoder 220 determining that the secondary-side controller 116 has sent the PFC-disable pulse pattern, the primary-side controller 114 can cause PFC_en 224 to go from high to low. PFC enable 224 going from high to low can cause the PFCC 106 to disable PFC.

As another example, regarding the primary-side FET control pulse protocol, in response to the decoder 220 determining that the secondary-side controller 116 has sent a pulse having a second signal level equal to $V_3$ 216-3 (e.g., 3.3 V), the decoder 220 can use a driver 222-2 to drive a primary-side FET signal ("PRIM_FET") from low to high to activate the primary-side FET 110. Similarly, in response to the decoder 220 determining that the secondary-side controller 116 has sent a pulse having a third signal level equal to $V_1$ 216-1 (e.g., a negative voltage), the decoder 220 can use a driver 222-2 to drive a primary-side FET signal ("PRIM_FET") from high-to-low to deactivate the primary-side FET 110. Further details regarding the PFC control pulse protocol and the primary-side FET control pulse protocol will now be described below with reference to FIG. 3.

Figure 3:
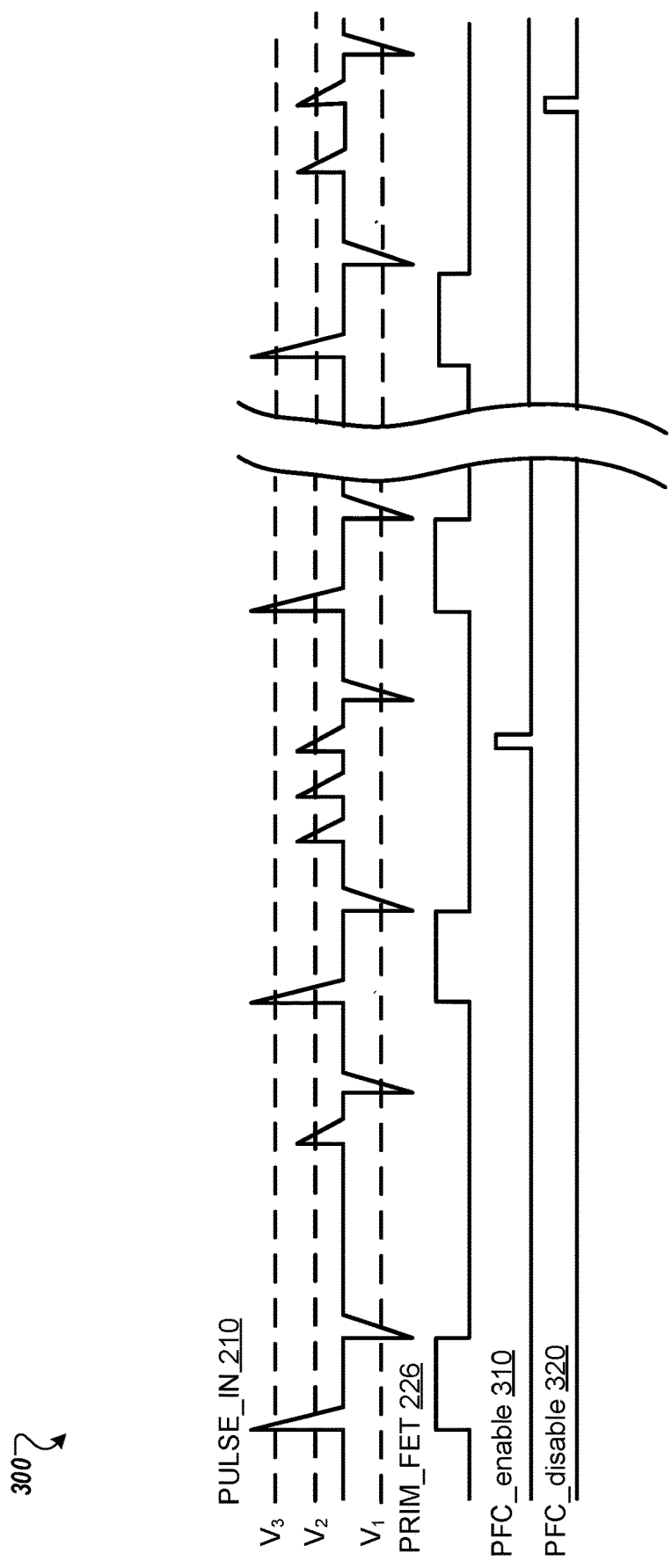
FIG. 3 is a diagram illustrating a pulse protocol to enable efficiency improvement for power factor correction based AC-DC power adapters, according to some embodiments.

FIG. 3 is a diagram 300 illustrating an example pulse protocol to enable efficiency improvement for power factor correction based AC-DC power adapters, according to some embodiments. More specifically, diagram 300 illustrates an example of level-based amplitude modulation.

For example, the diagram 300 shows PULSE_IN 210, PRIM_FET 226, a PFC-enable pulse pattern (PFC_enable 310), and a PFC-disable pulse pattern (PFC_disable) 320, as described above with reference to FIG. 2. PULSE_IN 210 can be within a range of voltage levels. A number of voltage threshold levels are shown, including a low voltage threshold level ("$V_1$"), a medium voltage threshold level ("$V_2$"), and a high voltage threshold level ("$V_3$"). In some embodiments, $V_1$ is a negative voltage value, $V_2$ is a positive voltage value, and $V_3$ is a positive voltage value greater than $V_2$. For example, $V_2$ can be 1.8 V, and $V_3$ can be 3.3 V.

PULSE_IN 210 can be used to implement a primary-side FET control pulse protocol that signals the primary-side controller to activate/deactivate a primary-side FET. For example, as shown in FIG. 3, driving PULSE_IN 210 from its base voltage (e.g., 0 V) to a first voltage at or above $V_3$ causes PRIM_FET 226 to go from low to high (e.g., turning the primary-side FET on), and driving PULSE_IN 210 from the first voltage to a second voltage at or below $V_1$ causes PRIM_FET 226 to go from high to low (e.g., turning the primary-side FET off). For example, the first voltage can be 3.3 V, and the second voltage can be a negative voltage.

PULSE_IN 210 can be further used to implement a PFC control pulse protocol that signals the primary-side controller when to enable PFC by causing PFC_enable 224 to go from low to high, and when to disable PFC by causing PFC_disable 226 to go from low to high. In some embodiments, the PFC control pulse protocol employs a PFC-enable pulse pattern defined by a first number of consecutive pulses and a PFC-disable pulse pattern defined by a second number of consecutive pulses. For example, as shown in FIG. 3, each pulse corresponds to driving PULSE_IN 210 from its base voltage to a third voltage between $V_2$ and $V_3$ (e.g., at or above $V_2$ and less than $V_3$). For example, the third voltage can be 1.8 V. The pulse protocols are shown in FIG. 3 are exemplary, and any suitable pulse protocols can be used to activate/deactivate the primary-side FET and/or enable/disable PFC in accordance with embodiments described herein.

Figure 4:
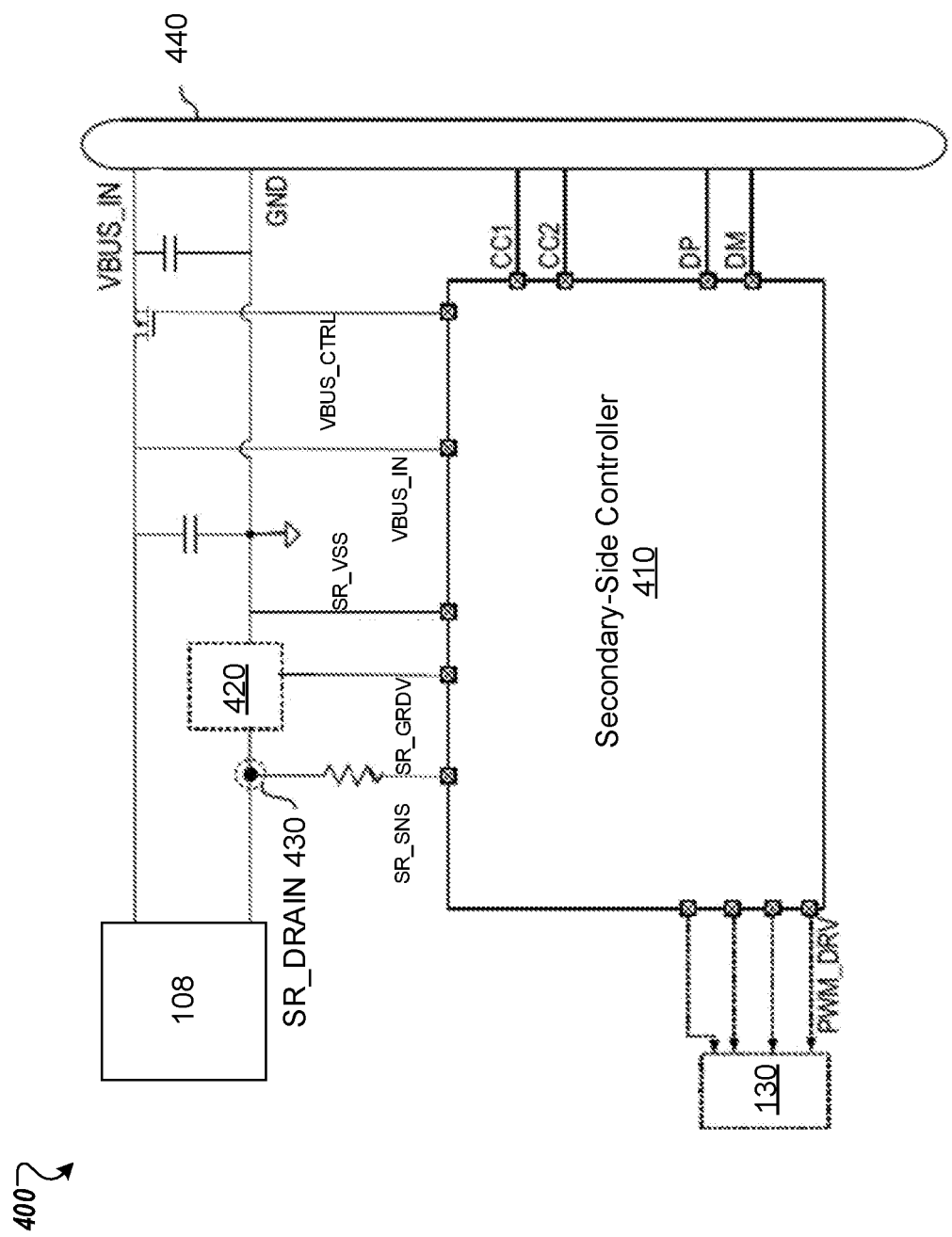
FIG. 4 is a schematic diagram of an example secondary side circuitry of a Universal Serial Bus power delivery (USB-PD) power adapter, according to some embodiments.

FIG. 4 is a schematic diagram of an example secondary side 400 of a Universal Serial Bus power delivery (USB-PD) power adapter, according to some embodiments. More specifically, the secondary side 400 can include a secondary-side controller 410, a transistor 420, a drain node (SR_DRAIN) 430, and can be coupled to the primary side via the transformers 108 and 130, described above with reference to FIG. 1. The secondary-side controller 410 can be similar to the secondary-side controller 116 of FIGS. 1-2, and the transistor 420 can be similar to the secondary-side FET 112 of FIG. 1. The USB-PD power adapter can be similar to AC-DC power adapter 100 of FIG. 1 and can further include a primary-side controller communicatively coupled to the secondary-side controller 116 via the pulse transformer 130 (e.g., such as the primary-side controller 114 of FIGS. 1-2), a primary-side FET (e.g., such as the primary-side FET 110 of FIGS. 1-2), a rectifier component (e.g., such as the rectifier component 104 of FIG. 1), a power factor correction (PFC) component (e.g., such as PFCC 106 of FIGS. 1-2), etc. As further shown, the secondary side 400 can further include, or be coupled to, a USB connector 440. In some embodiments, the USB connector 440 is a USB Type-C™ connector.

The secondary-side controller 410 may be disposed as an integrated circuit (IC) chip that includes a USB-PD subsystem configured in accordance with the techniques for gate driver control described herein. The secondary-side controller 410 is configured to negotiate a PD contract with a consumer device (not shown) attached to the USB connector 440 and to control through an output pin ("PWM_DRV") the required VBUS voltage that is output from transformer 108. USB connector 440 is typically associated with a plug (e.g., Type-C™ plug), but it should be understood that, in various embodiments, the USB Type-C™ connector 440 may be associated with a receptacle instead (e.g., Type-C™ receptacle). The transformer 108 can be coupled to a rectified DC power source on the primary side of the power adapter.

The secondary-side controller 410 is coupled to the VBUS_IN line and is configured to control the operation and state of power switches when fault conditions are detected by providing control signals to the gate of the switches. VBUS_IN line can include a provider switch configured as an on/off switch device controlled by signals from an output pin ("VBUS Control") of a gate driver in the secondary-side controller 410. The power switch may correspond to a provider FET. On one side of the provider switch, a power source node on the VBUS_IN line can be coupled to the transformer 108, which is coupled to a large bulk capacitor configured to remove the AC component of the power signal. A power source node can be coupled to an input pin ("VBUS_IN") of the secondary-side controller 410. An output node on the VBUS_IN line is coupled to USB Type-C™ connector 440 and another input pin ("VBUS CTRL") of the secondary-side controller 410.

In operation, the direction of power flow on the VBUS_IN line is from the transformer 108 to a consumer device, such as a laptop computer (not shown), that is attached to USB connector 440. When a PD contract with the consumer device is negotiated, the secondary-side controller 410 can cause power to be provided to the consumer device at the negotiated voltage and/or current level(s) (e.g., via a provider switch). A high-to-low voltage transition on the VBUS_IN line may be needed when the PD contract is dynamically re-negotiated to lower the VBUS voltage and/or current, e.g., when the consumer device has finished charging its battery and now needs power only to operate.

On detection of fault conditions, a control signal may be sent to disconnect the USB connector 440 from the transformer 108. For example, the provider switch can be turned off by driving the output of VBUS_CTRL to zero. This disconnection may be caused by an over-voltage condition, an over-current condition, or other conditions that may require disconnection of the USB Type-C™ connector 440 from the transformer 108 for protection of circuits coupled to the USB Type C connector 440.

The embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, an SBPD device is a USB-PD device that is compatible with the USB-PD standard or, more generally, with the USB standard. For example, the SBPD device may provide an output voltage (e.g., VBUS_CTRL, power supply voltage) based on an input voltage (e.g., VBUS, power supply voltage). The SBPD device may include the various embodiments described herein to facilitate communications between a primary-side controller and a secondary-side controller. The SBPD device may include a power converter (e.g., an AC-DC converter) and a power control analog subsystem (e.g., a USB-PD controller). The power control analog subsystem may include the circuitry, functionality, or both, as described herein for communicating information across a galvanic isolation barrier. The information can include information for different functions, such as OVP (over voltage protection), UVP (under voltage protection), OCP (over current protection), SCP (short circuit protection), PFC (power factor correction), SR (synchronous rectification), ACF (active clamp flyback), or the like. The information can include fault information for any of these different functions.

In other embodiments, the SBPD device is connected to a power source, such as a wall socket power source that provides AC power. In other embodiments, the power source may be a different power source, such as a battery, and may provide DC power to the SBPD device. The power converter may convert the power received from the power source (e.g., convert power received to VBUS). For example, a power converter may be an AC-DC converter and convert AC power from the power source to DC power. In some embodiments, the power converter is a flyback converter, such as a secondary-controlled flyback converter, that provides galvanic isolation between the input (e.g., primary-side) and the output (e.g., secondary-side). For example, the secondary-controlled flyback converter may be a single-ended forward converter. In some embodiments, feed-forward information on the secondary-side can be used to limit the maximum duty cycle that can be passed to the primary-side FET. The maximum duty cycle may change with line voltage.

In some embodiments, the SBPD device provides VBUS_CTRL to a sink device (e.g., via a configuration channel (CC) specifying a particular output voltage, and possibly an output current). SBPD device may also provide access to ground potential (e.g., ground) to the sink device. In some embodiments, the providing of the VBUS_CTRL is compatible with the USB-PD standard. Power control analog subsystem may receive VBUS from the power converter. The power control analog subsystem may output VBUS. In some embodiments, the power control analog subsystem is a USB Type-C™ controller compatible with the USB Type- C™ standard. The power control analog subsystem may provide system interrupts responsive to the VBUS and the VBUS_CTRL.

In some embodiments, any of the components of the SBPD device may be part of an IC, or alternatively, any of the components of the SBPD device may be implemented in its own IC. For example, the power converter and power control analog subsystem may be discrete ICs with separate packaging and pin configurations.

In some embodiments, the SBPD device may provide a complete USB Type-C™ and USB-PD port control solution for notebooks, dongles, monitors, docking stations, power adapters, vehicle chargers, power banks, mobile adaptors, and the like.

Embodiments when using isolation or level shifters may require some driver circuit. The driver circuit may be as simple as using a PWM output from the secondary-side controller to drive a capacitive coupled controller or opto-coupler. The driver circuit can be an elaborate structure when driving a pulse transformer.

Figure 5:
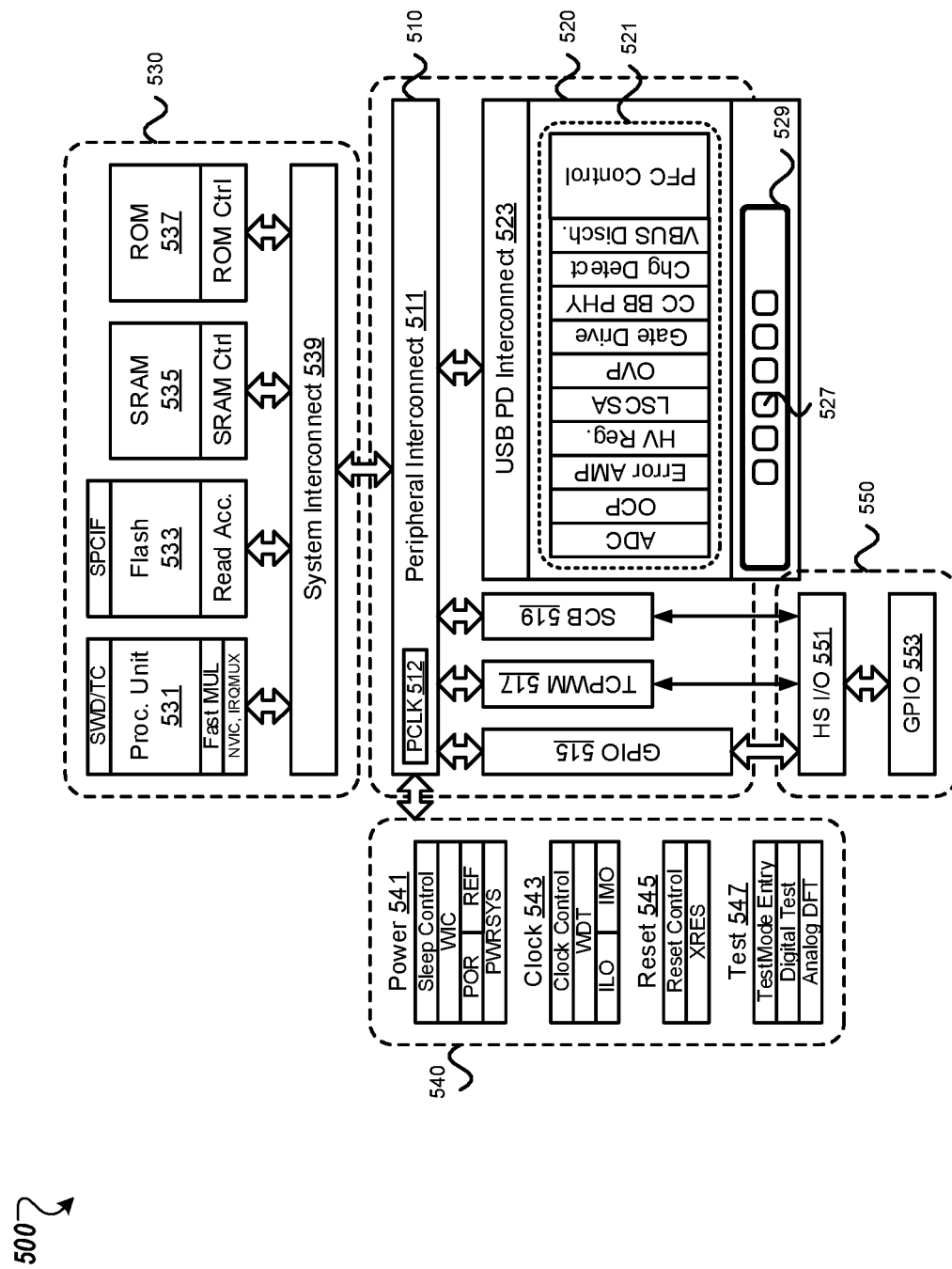
FIG. 5 is a block diagram illustrating an integrated circuit (IC) system for a Universal Serial Bus (USB) device for use in Universal Serial Bus (USB) power delivery, according to some embodiments.

FIG. 5 is a block diagram illustrating an integrated circuit (IC) system 500 for a USB-enabled device for use in USB power delivery, according to some embodiments. System 500 may include a peripheral subsystem 510, including a number of components for use in USB Power Delivery (USB-PD). Peripheral subsystem 510 may include a peripheral interconnect 511, including a clocking module and a peripheral clock (PCLK) 512 for providing clock signals to the various components of peripheral subsystem 510. Peripheral interconnect 511 may be a peripheral bus, such as a single-level or multi-level advanced high-performance bus (AHB), and may provide a data and control interface between peripheral subsystem 510, central processing unit (CPU) subsystem 530, and system resources 540. Peripheral interconnect 511 may include controller circuits, such as direct memory access (DMA) controllers, which may be programmed to transfer data between peripheral blocks without input by, control of, or burden on CPU subsystem 530.

The peripheral interconnect 511 may be used to couple components of peripheral subsystem 510 to other components of system 500. Coupled to peripheral interconnect 511 may be a number of general-purpose input/outputs (GPIOs) 515 for sending and receiving signals. GPIOs 515 may include circuits configured to implement various functions such as pull-up, pull-down, input threshold select, input and output buffer enabling/disable, single multiplexing, etc. Still, other functions may be implemented by GPIOs 515. One or more timer/counter/pulse-width modulator (TCPWM) 517 may also be coupled to the peripheral interconnect and include circuitry for implementing timing circuits (timers), counters, pulse-width modulators (PWMs) decoders, and other digital functions that may operate on I/O signals and provide digital signals to system components of system 500. Peripheral subsystem 510 may also include one or more serial communication blocks (SCBs) 519 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 510 may include a USB power delivery subsystem 520 coupled to the peripheral interconnect 511 and comprising a set of USB-PD modules 521 for use in USB power delivery. USB-PD modules 521 may be coupled to the peripheral interconnect 511 through a USB-PD interconnect 523. USB-PD modules 521 may include an analog-to-digital conversion (ADC) module for converting various analog signals to digital signals; an error amplifier (AMP) regulating the output voltage on the VBUS_IN line per a PD contract; a high-voltage (HV) regulator for converting the power source voltage to a precise voltage (such as 3.5-5V) to power system 500; a low-side current sense amplifier (LSCSA) for measuring load current accurately, an over-voltage protection (OVP) module and an over-current protection (OCP) module for providing over-current and over-voltage protection on the VBUS_IN line with configurable thresholds and response times; one or more gate drivers for external power field-effect transistors (FETs) used in USB power delivery in provider and consumer configurations; and a communication channel PHY (CC BB PHY) module for supporting communications on a Type-C™ configuration channel (CC) line. USB-PD modules 521 may also include a charger detection module for determining that a charging circuit is present and coupled to system 500 and a VBUS discharge module for controlling the discharge of voltage on VBUS. The discharge control module may be configured to couple to a power source node on the VBUS_IN line or to an output (power sink) node on the VBUS_IN line and to discharge the voltage on the VBUS_IN line to the desired voltage level (i.e., the voltage level negotiated in the PD contract). USB power delivery subsystem 520 may also include pads 527 for external connections and electrostatic discharge (ESD) protection circuitry 529, which may be required on a Type-C™ port. USB-PD modules 521 may also include a communication module for retrieving and communicating information, such as control signals from a secondary-side controller to a primary-side controller.

GPIO 515, TCPWM 517, and SCB 519 may be coupled to an input/output (I/O) subsystem 550, which may include a high-speed (HS) I/O matrix 551 coupled to a number of GPIOs pins 553. GPIOs 515, TCPWM 517, and SCB 519 may be coupled to GPIOs pins 553 through HS I/O matrix 551.

System 500 may also include a central processing unit (CPU) subsystem 530 for processing commands, storing program information, and storing data. CPU subsystem 530 may include one or more processing units 531 for executing instructions and reading from and writing to memory locations from a number of memories. Processing unit 531 may be a processor suitable for operation in an integrated circuit (IC) or a system-on-chip (SOC) device. In some embodiments, processing unit 531 may be optimized for low-power operation with extensive clock gating. In this embodiment, various internal control circuits may be implemented for processing unit operation in various power states. For example, processing unit 531 may include a wake-up interrupt controller (WIC) configured to wake the processing unit up from a sleep state, allowing power to be switched off when the IC or SOC is in a sleep state. CPU subsystem 530 may include one or more memories, including a flash memory 533, static random access memory (SRAM) 535, and a read-only memory (ROM) 537. Flash memory 533 may be a non-volatile memory (NAND flash, NOR flash, etc.) configured for storing data, programs, and/or other firmware instructions. Flash memory 533 may include a read accelerator and may improve access times by integration within CPU subsystem 530. SRAM 535 may be a volatile memory configured for storing data and firmware instructions accessible by processing unit 531. ROM 537 may be configured to store boot-up routines, configuration parameters, and other firmware parameters and settings that do not change during the operation of system 500. SRAM 535 and ROM 537 may have associated control circuits. Processing unit 531 and the memories may be coupled to a system interconnect 539 to route signals to and from the various components of CPU subsystem 530 to other blocks or modules of system 500. System interconnect 539 may be implemented as a system bus such as a single-level or multi-level AHB. System interconnect 539 may be configured as an interface to couple the various components of CPU subsystem 530 to each other. System interconnect 539 may be coupled to peripheral interconnect 511 to provide signal paths between the components of CPU subsystem 530 and peripheral subsystem 510.

System 500 may also include a number of system resources 540, including a power module 541, a clock module 543, a reset module 545, and a test module 547. Power module 541 may include a sleep control module, a wake-up interrupt control (WIC) module, a power-on-reset (POR) module, a number of voltage references (REF), and a PWRSYS module. In some embodiments, power module 541 may include circuits that allow system 500 to draw and/or provide power from/to external sources at different voltage and/or current levels and support controller operation in different power states, such as active, low-power, or sleep. In various embodiments, more power states may be implemented as system 500 throttles back operation to achieve a desired power consumption or output. For example, the secondary-side controller may access secondary electrical parameters on the secondary-side. At low line and light load, the secondary-side controller may determine that the power state is such that it is not beneficial to switch on an ACF FET. Clock module 543 may include a clock control module, a watchdog timer (WDT), an internal low-speed oscillator (ILO), and an internal main oscillator (IMO). Reset module 545 may include a reset control module and an external reset (XRES) module. Test module 547 may include a module to control and enter a test mode as well as testing control modules for analog and digital functions (digital test and analog DFT).

System 500 may be implemented in a monolithic (e.g., single) semiconductor die. In other embodiments, various portions or modules of system 500 may in implemented on different semiconductor dies. For example, memory modules of CPU subsystem 530 may be on-chip or separate. In other embodiments, separate-die circuits may be packaged into a multi-chip module.

System 500 may be implemented in a number of application contexts to provide USB-PD functionality thereto. In each application context, an IC controller or SOC implementing system 500 may be disposed and configured in an electronic device (e.g., a USB-enabled device) to perform operations in accordance with the techniques described herein. In one example embodiment, a system 500 may be disposed and configured in a personal computer (PC) power adapter for a laptop, a notebook computer, etc. In another example embodiment, system 500 may be disposed and configured in a power adapter (e.g., a wall charger) for a mobile electronic device (e.g., a smartphone, a tablet, etc.). In another example embodiment, system 500 may be disposed and configured in a wall socket that provides power over USB Type-A and/or Type-C™ port(s). In another example embodiment, system 500 may be disposed and configured in a power bank that can get charged and then provide power to another electronic device over a USB Type-A or Type-C™ port. In other embodiments, a system like system 500 may be configured with the power switch gate control circuitry described herein and may be disposed in various other USB-enabled electronic or electro-mechanical devices.

It should be understood that a system, like system 500 implemented on or as an IC controller, may be disposed into different applications, which may differ with respect to the type of power source being used and the direction in which power is being delivered. For example, in the case of a mobile power adapter, the power source is an AC wall socket. Further, in the case of a PC power adapter, the flow of power delivery is from a provider device to a consumer device, while in the case of a power bank, the flow of power delivery may be in both directions depending on whether the power bank is operating as a power provider (e.g., to power another device) or as a power consumer (e.g., to get charged itself). For these reasons, the various applications of system 500 should be regarded in an illustrative rather than a restrictive sense.

Figure 6A:
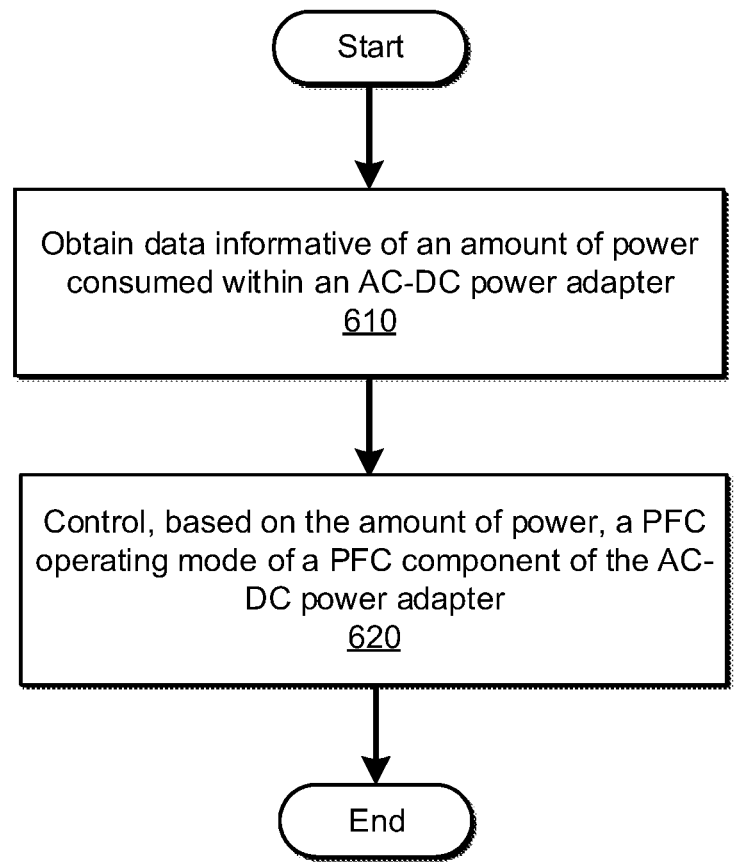
FIG. 6A is a flow diagram of a method of improving efficiency for power factor correction (PFC) based AC-DC power adapters, according to some embodiments.

FIG. 6A is a flow diagram of a method 600 of improving efficiency for power factor correction (PFC) based AC-DC power adapters, according to some embodiments. The method 600 may be performed by processing logic that comprises hardware (e.g., circuitry, dedicated logic, programmable logic, microcode, etc.), software, firmware, or a combination thereof. In some embodiments, a secondary-side controller in a secondary-side controlled (SSC) AC-DC power adapter performs the method 600 (e.g., the secondary-side controller of FIGS. 1-4). In some embodiments, the peripheral subsystem 510 of FIG. 5 performs the method 600.

At operation 610, processing logic obtains data informative of an amount of power consumed within an AC-DC power adapter. For example, the data can include at least one of output voltage, load current, output power, AC line-in, etc. The processing logic can be implemented by a secondary-side controller that is galvanically isolated from a primary-side controller. For example, the secondary-side controller and the primary-side controller can each be coupled to a transformer that provides the galvanic isolation. In some embodiments, the transformer is a pulse transformer.

At operation 620, processing logic controls, based on the amount of power, a PFC operating mode of a PFC component of the AC-DC power adapter. The PFC component is coupled to the primary-side controller. In some embodiments, the PFC component includes PFC circuitry. For example, the PFC component can operate in a PFC-enable mode in which PFC is enabled, or a PFC-disable mode in which PFC is disabled.

In some embodiments, controlling the PFC operating mode of the PFC component includes generating, based on the amount of power, a power factor correction (PFC)-control signal to cause the primary-side controller to control the PFC operating mode. In some embodiments, controlling the PFC operating mode of the PFC component includes maintaining a current PFC operating mode. Further details regarding operation 620 will now be described below with reference to FIG. 6B.

Figure 6B:
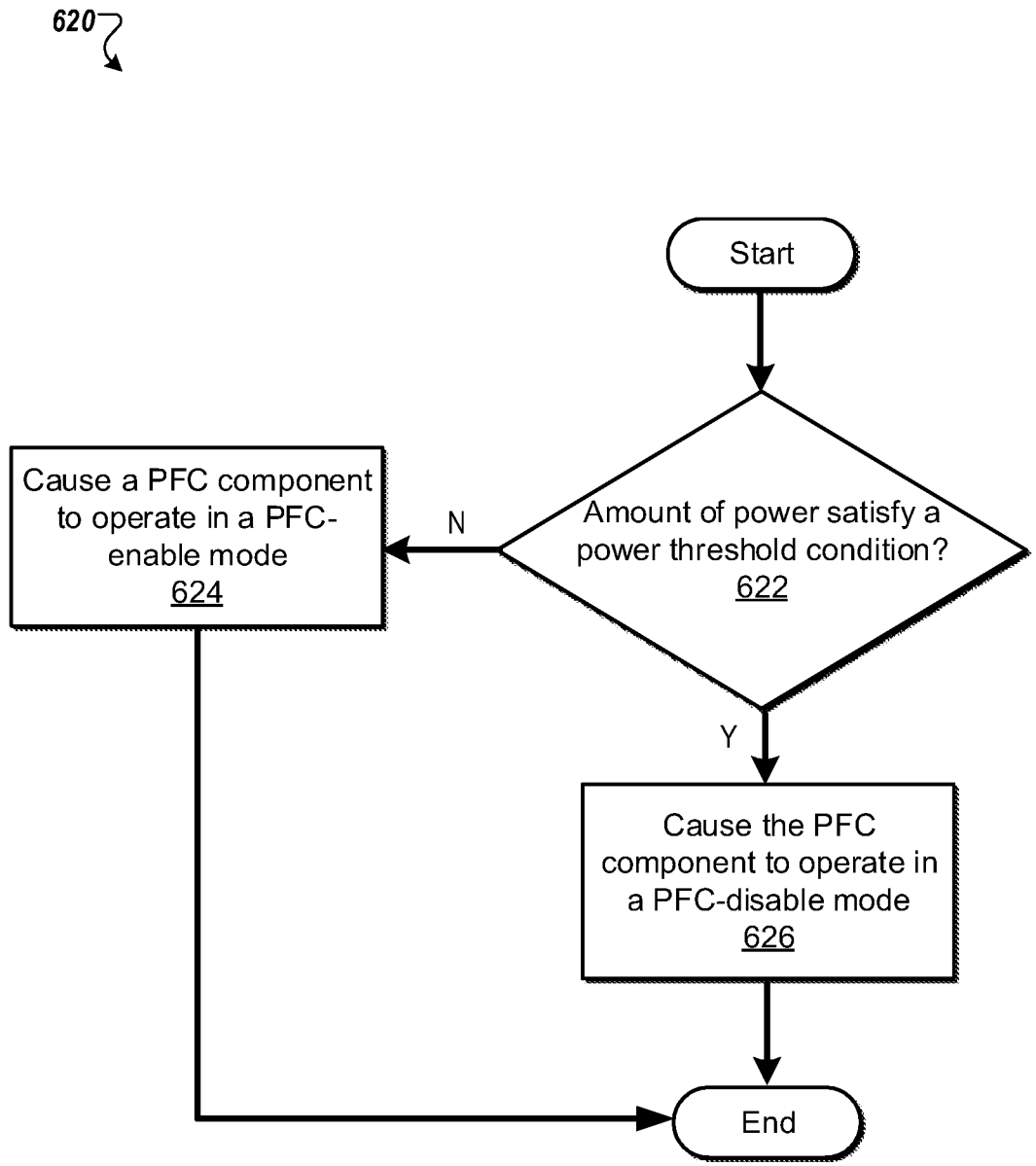
FIG. 6B is a flow diagram of a method of generating, based on an amount of power, a power factor correction (PFC)-control signal to cause a primary-side controller to control a PFC operating mode of a PFC component, according to some embodiments.

FIG. 6B is a flow diagram of an example method 620 of generating, based on an amount of power, a PFC-control signal to cause a primary-side controller to control a PFC operating mode of a PFC component, according to some embodiments. The method 620 may be performed by processing logic that comprises hardware (e.g., circuitry, dedicated logic, programmable logic, microcode, etc.), software, firmware, or a combination thereof. In some embodiments, a secondary-side controller in a secondary-side controlled (SSC) AC-DC power adapter performs the method 620 (e.g., the secondary-side controller of FIGS. 1-4). In some embodiments, the peripheral subsystem 510 of FIG. 5 performs the method 620.

At operation 622, processing logic determines whether an amount of power satisfies a power threshold condition. For example, the amount of power can be the amount of power obtained at operation 610 of FIG. 6A. In some embodiments, the power threshold condition is a pre-defined power threshold value, and determining whether the amount of power satisfies the power threshold condition includes determining whether the amount of power is less than the power threshold value. Illustratively, the power threshold value can be about 75 W. The power threshold condition can be programmable (e.g., a programmable power threshold value).

If the processing logic determines that the amount of power does not satisfy the power threshold condition (e.g., the amount of power is greater than or equal to the power threshold value), this means that PFC should be enabled to improve the operating efficiency and reduce peak current and total harmonic distortion (THD) of the AC-DC power adapter. At operation 624, the processing logic can cause a PFC component to operate in a PFC-enable mode.

In some embodiments, causing the PFC component to operate in the PFC-enable mode includes generating a first PFC-control signal. The first PFC-control signal can cause a primary-side controller to modulate a level of a PFC-enable signal to cause the PFC component to operate in the PFC-enable mode (e.g., in response to the primary-side controller receiving the first PFC-control signal). For example, the primary-side controller can cause the PFC-enable signal to go from a low voltage level to a high voltage level, which can cause the PFC controller to operate in the PFC-enable mode.

In some embodiments, causing the PFC component to operate in the PFC-enable mode comprises maintaining operation of the PFC component in the PFC-enable mode.

Otherwise, if the processing logic determines that the amount of power satisfies the power threshold condition (e.g., the amount of power is less than the power threshold value), this means that PFC should be disabled to improve the operating efficiency of the AC-DC power adapter. At operation 626, the processing logic can cause the PFC component to operate in a PFC-disable mode.

In some embodiments, causing the PFC component to operate in the PFC-disable mode comprises generating a second PFC-control signal, and sending the second PFC-control signal to the primary-side controller. The second PFC-control signal can cause the primary-side controller to modulate a level of a PFC-disable signal to cause the PFC component to operate in the PFC-disable mode (e.g., in response to the primary-side controller receiving the second PFC-control signal). For example, the primary-side controller can cause the PFC-disable control signal to go from a low voltage level to a high voltage level, which can cause the PFC controller to operate in the PFC-disable mode.

In some embodiments, causing the PFC component to operate in the PFC-disable mode comprises maintaining operation of the PFC component in the PFC-disable mode.

The first PFC-control signal and the second PFC-control signal can be generated in accordance with a PFC control protocol that utilizes pulses generated by the processing logic. For example, the PFC control protocol can employ level-based amplitude pulse modulation. Each pulse can have a voltage level that falls within a range of voltage levels. The range of voltage levels can include a low voltage threshold level ("$V_1$"), a medium voltage threshold level ("$V_2$"), and a high voltage threshold level ("$V_3$"). In some embodiments, $V_1$ is a negative voltage value, $V_2$ is a positive voltage value, and $V_3$ is a positive voltage value greater than $V_2$. For example, $V_2$ can be 1.8 V, and $V_3$ can be 3.3 V.

In some embodiments, the first PFC-control signal the second-PFC control signal are generated in accordance with a PFC pulse protocol employing a set of pulse patterns. The set of pulse patterns can include a PFC-enable pulse pattern defining the first PFC-control signal, and a PFC-disable pulse pattern defining the second PFC-control signal.

The PFC-enable pulse pattern can be defined by a first number of consecutive pulses, and a PFC-disable pulse pattern can be defined by a second number of consecutive pulses different from the first number of consecutive pulses. For example, the first number of consecutive pulses can be three pulses, and the second number of consecutive pulses can be two pulses. Each consecutive pulse can drive the signal from a base voltage (e.g., 0 V) to a designated positive voltage (e.g., 1.8 V). Accordingly, in response to receiving the first number of consecutive pulses, the primary-side controller can cause the PFC-enable signal to go from the low voltage level to the high voltage level to cause the PFC controller to operate in the PFC-enable mode and, in response to receiving the second number of consecutive pulses, the primary-side controller can cause the PFC-disable signal to go from the low voltage level to the high voltage level to cause the PFC controller to operate in the PFC-disable mode. Further details regarding FIGS. 6A-6B are described above with reference to FIGS. 1-5.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, the use of the words "example" or "exemplary" is intended to present concepts concretely. As used in this application, the term "or" is intended to mean an inclusive "or" rather than an exclusive "or." Unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein based on instructions of a computer program. Such a computer program may be stored in a non-transitory computer-readable storage medium, such as, but not limited to, any type of disk, including optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media that store one or more sets of instructions. The term "computer-readable medium" shall also be taken to include any medium capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The above description sets forth numerous specific details, such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. Therefore, the disclosure scope should be determined with reference to the appended claims, along with the full scope of equivalents to which such claims are entitled.

What is claimed is:

1. An apparatus comprising:
a transformer;
a primary-side controller coupled to the transformer;
a power factor correction (PFC) component coupled to the primary-side controller; and
a secondary-side controller coupled to the transformer, wherein the secondary-side controller is configured at least to:
obtain data informative of an amount of power;
determine whether the amount of power satisfies a power threshold condition; and
in response to determining that the amount of power satisfies the power threshold condition, cause the PFC component to operate in a PFC-disable mode by generating a PFC control signal that causes the primary-side controller to modulate a level of a PFC-disable signal.

2. The apparatus of claim 1, wherein the secondary side controller is further configured to:
in response to determining that the amount of power does not satisfy the power threshold condition, cause the PFC component to operate in a PFC-enable mode.

3. The apparatus of claim 2, wherein, to cause the PFC component to operate in the PFC-enable mode, the secondary side controller generates a second PFC-control signal, and wherein the second PFC-control signal causes the primary-side controller to modulate a level of a PFC-enable signal to cause the PFC component to operate in the PFC-enable mode.

4. The apparatus of claim 1, further comprising a primary-side field-effect transistor (FET) coupled to the primary-side controller.

5. The apparatus of claim 1, further comprising a pulse transformer.

6. The apparatus of claim 1, further comprising a secondary-side field-effect transistor (FET) coupled to the secondary-side controller.

7. The apparatus of claim 6, wherein the secondary-side FET and the secondary-side controller are coupled to a USB connector.

8. The apparatus of claim 1, further comprising:
an alternating current (AC) input; and
a rectifier component coupled to the AC input.

9. A method comprising:
obtaining, by a secondary-side controller of an alternating current (AC) to direct current (DC) (AC-DC) power adapter, data informative of an amount of power;
determining, by the secondary-side controller, whether the amount of power satisfies a power threshold condition; and
in response to determining that the amount of power satisfies the power threshold condition, causing, by the secondary-side controller, a power factor correction (PFC) component of the AC-DC power adapter to operate in a PFC-disable mode by generating a PFC control signal that causes a primary-side controller of the AC-DC power adapter to modulate a level of a PFC-disable signal.

10. The method of claim 9, further comprising:
in response to determining that the amount of power does not satisfy the power threshold condition, causing, by the secondary-side controller, the PFC component to operate in a PFC-enable mode.

11. The method of claim 10, wherein causing the PFC component to operate in the PFC-enable mode comprises generating a second PFC-control signal, and wherein the second PFC-control signal causes the primary-side controller to modulate a level of a PFC-enable signal to cause the PFC component to operate in the PFC-enable mode.

12. A secondary-side controlled (SSC) alternating current (AC) to direct current (DC) (AC-DC) power adapter comprising:
an AC input;
a rectifier component coupled to the AC input;
a USB connector;
a pulse transformer;
a power factor correction (PFC) component;
a primary-side field-effect transistor (FET);
a secondary-side FET coupled to the USB connector;
a primary-side controller coupled to the primary-side FET, the pulse transformer, and the PFC component; and
a secondary-side controller coupled to the secondary-side FET, the pulse transformer, and the USB connector, wherein the secondary-side controller is configured at least to:
obtain data informative of an amount of power;
determine whether the amount of power does not satisfy a power threshold condition; and in response to determining that the amount of power does not satisfy the power threshold condition, cause the PFC component to operate in a PFC-enable mode.

13. The SSC AC-DC power adapter of claim 12, wherein, to cause the PFC component to operate in the PFC-enable mode, the secondary side controller generates a PFC-control signal, and wherein the PFC-control signal causes the primary-side controller to modulate a level of a PFC-enable signal to cause the PFC component to operate in the PFC-enable mode.

14. The SSC AC-DC power adapter of claim 12, wherein; the secondary side controller, in response to determining that the amount of power satisfies the power threshold condition, causes the PFC component to operate in a PFC-disable mode.

15. The SSC AC-DC power adapter of claim 14, wherein, to cause the PFC component to operate in the PFC-disable mode, the secondary side controller generates a PFC-control signal, and wherein the PFC-control signal causes the primary-side controller to modulate a level of a PFC-disable signal to cause the PFC component to operate in the PFC-disable mode.

* * * * *